(12) United States Patent
Chow et al.

(10) Patent No.: US 6,725,217 B2
(45) Date of Patent: Apr. 20, 2004

(54) METHOD AND SYSTEM FOR KNOWLEDGE REPOSITORY EXPLORATION AND VISUALIZATION

(75) Inventors: Amy W. Chow, Norwalk, CT (US); Jeffrey T. Kreulen, San Jose, CA (US); Justin T. Lessler, San Jose, CA (US); Larry L. Proctor, Coppell, TX (US); W. Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 09/885,201

(22) Filed: Jun. 20, 2001

(65) Prior Publication Data

US 2003/0004932 A1 Jan. 2, 2003

(51) Int. Cl.[7] ............................................... G06F 17/30
(52) U.S. Cl. .......................................... 707/6; 707/102
(58) Field of Search ..................................... 707/6, 102

(56) References Cited

U.S. PATENT DOCUMENTS

| | | | |
|---|---|---|---|
| 5,181,162 A | | 1/1993 | Smith et al. |
| 5,404,514 A | | 4/1995 | Kageneck et al. |
| 5,488,725 A | | 1/1996 | Turtle et al. |
| 5,713,019 A | | 1/1998 | Keaten |
| 5,754,938 A | * | 5/1998 | Herz et al. ................... 725/116 |
| 5,857,185 A | | 1/1999 | Yamaura |
| 5,873,081 A | | 2/1999 | Harel |
| 5,875,441 A | | 2/1999 | Nakatsuyama |
| 5,940,821 A | * | 8/1999 | Wical ............................. 707/3 |
| 5,953,718 A | * | 9/1999 | Wical ............................. 707/5 |
| 5,963,208 A | | 10/1999 | Dolan et al. |
| 5,987,460 A | | 11/1999 | Niwa et al. |
| 6,023,715 A | | 2/2000 | Burkes et al. |
| 6,026,388 A | | 2/2000 | Liddy et al. |
| 6,092,065 A | * | 7/2000 | Floratos et al. ................. 707/6 |
| 6,112,203 A | | 8/2000 | Bharat et al. |
| 6,175,830 B1 | | 1/2001 | Maynard |
| 6,182,039 B1 | * | 1/2001 | Rigazio et al. ............. 704/257 |
| 6,356,899 B1 | * | 3/2002 | Chakrabarti et al. ........... 707/5 |
| 6,363,378 B1 | * | 3/2002 | Conklin et al. ................. 707/5 |
| 6,510,406 B1 | * | 1/2003 | Marchisio ...................... 704/9 |
| 6,523,026 B1 | * | 2/2003 | Gillis ............................. 707/3 |

OTHER PUBLICATIONS

Abstract: Xiaonong et al., "Fast Shape Retrieval Using Term Frequency Vectors", Proceedings IEEE Workshop on Content–Based Access of Image and Video Libraries (CBAIVL '99) p. 18–22.

U.S. patent application Ser. No. 09/642,130, Ruvolo et al., filed Aug. 18, 2000.

* cited by examiner

*Primary Examiner*—Wayne Amsbury
(74) *Attorney, Agent, or Firm*—Jose Gutman; Fleit, Kain, Gibbons, Gutman, Bongini & Bianco P.L.

(57) ABSTRACT

A computing system and method explores a knowledge repository by accepting a natural language query from a user, determining a distance between the query and every category in every partitioning of the knowledge repository, and displaying a radial graph (322) of the nearest categories. Further, in response to a user selecting a category, visually displaying matching elements in the category along with its nearest neighbor categories in a scatter plot (324).

24 Claims, 7 Drawing Sheets

METHOD AND SYSTEM FOR KNOWLEDGE REPOSITORY EXPLORATION AND VISUALIZATION

BACKGROUND OF THE INVENTION

1. Field of the Invention

This invention generally relates to the field of computer based search systems, and more particularly relates to a system and method for visually searching knowledge bases.

2. Description of Related Art

Knowledge repositories are collections of information in computer system for capturing expertise in some strategic area. Their purpose is to retain and disseminate expert information to a user, such as within a corporation. An example of a knowledge repository in a computer software consulting company would be a set of documents describing what strategies have been used effectively in the past to win business away from each of the company's chief competitors.

The elements of the knowledge repository under consideration here are in electronic form and available for distribution. The size of the repository could outnumber several million separate pieces of information. Typically, the vastness of the knowledge repository causes users to rely primarily on search engines to retrieve information.

A typical search engine possesses a user interface with a search window where the user enters an alphanumeric search expression or keywords. The search engine sifts through a database of information for the user's search terms, and returns the search results in the form of HTML pages. Each search result includes a list of individual entries that have been identified by the search engine as satisfying the user's search expression. Each entry or "hit" includes a hyperlink that points to a location within the database. In addition to the hyperlink, certain search engine result pages include a summary or abstract that describes the content of the document. Other information may also be returned as part of a search result in response to a user's request.

Although search engines have made tremendous strides at improvement in recent years, the user interface can still be very complicated to use. Primarily, these interfaces place too many burdens on the inexperienced user to know which words to enter to retrieve only the best documents. As a further complication, the form of the result pages may not adequately indicate which documents truly contain the most relevant information for the user. Then, the user is forced to manually sort through a long list of results to try and determine what is most important to him. Additionally, for complex searches, users may even be called upon to employ Boolean operators, all of which serve to further confuse users.

Therefore a need exists to overcome the problems with the prior art as discussed above, and particularly for a user interface that visually displays corresponding search results and guides the user in exploring a knowledge repository.

SUMMARY OF THE INVENTION

According to a preferred embodiment of the present invention, a computing system and method provides a visual display for exploring a knowledge repository. This preferred method assumes that a knowledge expert has created a set of multiple partitionings of the knowledge repository according to the content of the knowledge elements, as well as a separate dictionary of terms for each partitioning. The method comprises the steps of accepting a natural language query, calculating the distance between the query string and a plurality of categories in partitions of a knowledge repository; and displaying, via a radial graph, at least one category that comprises a nearest distance to the query. Further, in response to the user selecting a category, the method visually displays all matching elements in that category along with its nearest neighbor categories in a scatter plot. This preferred method advantageously guides the user to better refine search queries.

DESCRIPTION OF THE PREFERRED EMBODIMENTS

The present invention, according to a preferred embodiment, overcomes problems with the prior art by guiding the user through a visual representation of all elements contained within a knowledge repository. The user may have little expertise in the area of interest to him. The user begins the search by entering a keyword or words of interest. For example, assuming the user was interested in wireless paging applications, the user would enter the word "wireless". The program could then initiate a search, in a previously partitioned database located either locally to the computer system, on a server located within the company Intranet, or even a remote Internet site. The elements may be categorized in a multitude of manners, such as by subject, country of origin, author, etc . . . much as a card catalog in a library system. Each category constitutes a partitioning, and each partitioning contains its own unique dictionary of terms.

As a result of this search, the user would be presented with a visual representation of the most relevant categories, and conceptual alternatives, in the database, in which the word "wireless" appears. The user then provides additional information, gradually, to winnow down the number of possible matching elements. Finally, the invention highlights specific areas of retrieved elements, which would be of greatest relevance to the user's previous input.

A significant aspect of the preferred embodiment is the approach of overlaying concept maps on top of a knowledge set, helping the user to understand the knowledge space and better refine his queries. The program then retrieves not simply element titles, but also the most relevant phrases within the most relevant elements. Such focused retrieval is important to prevent "knowledge retrieval overload".

Figure 1:
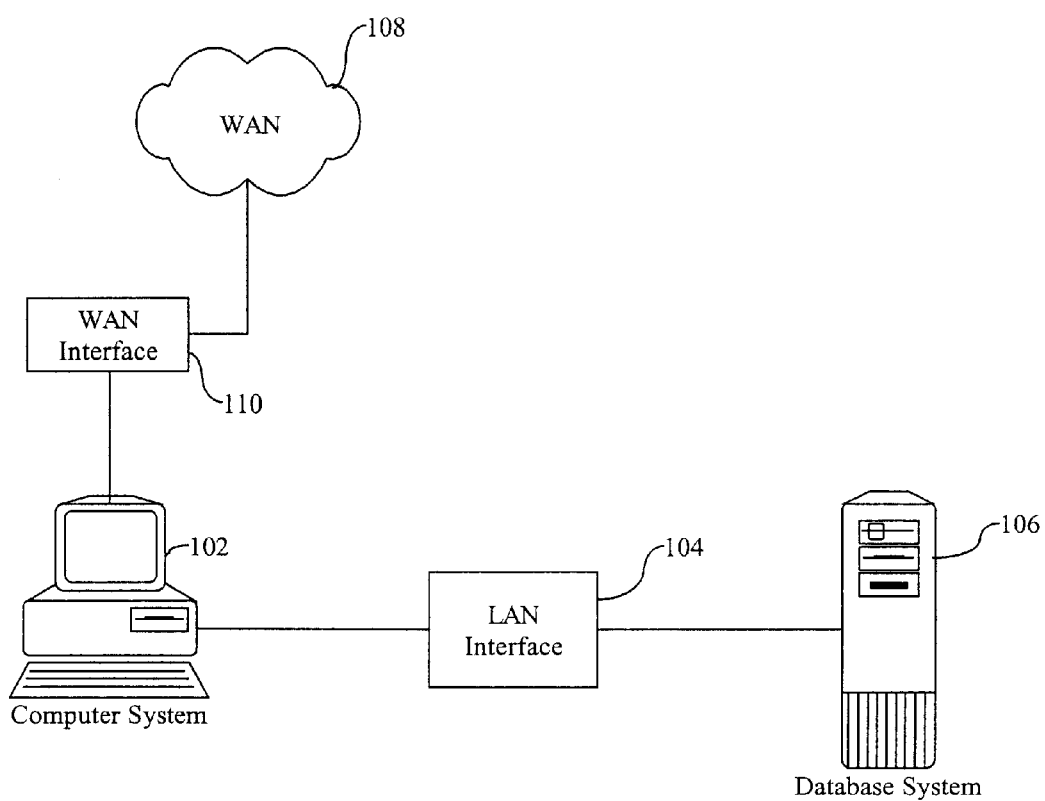
FIG. 1 is a block diagram illustrating a visual search system in accordance with a preferred embodiment of the present invention.
Figure 2:
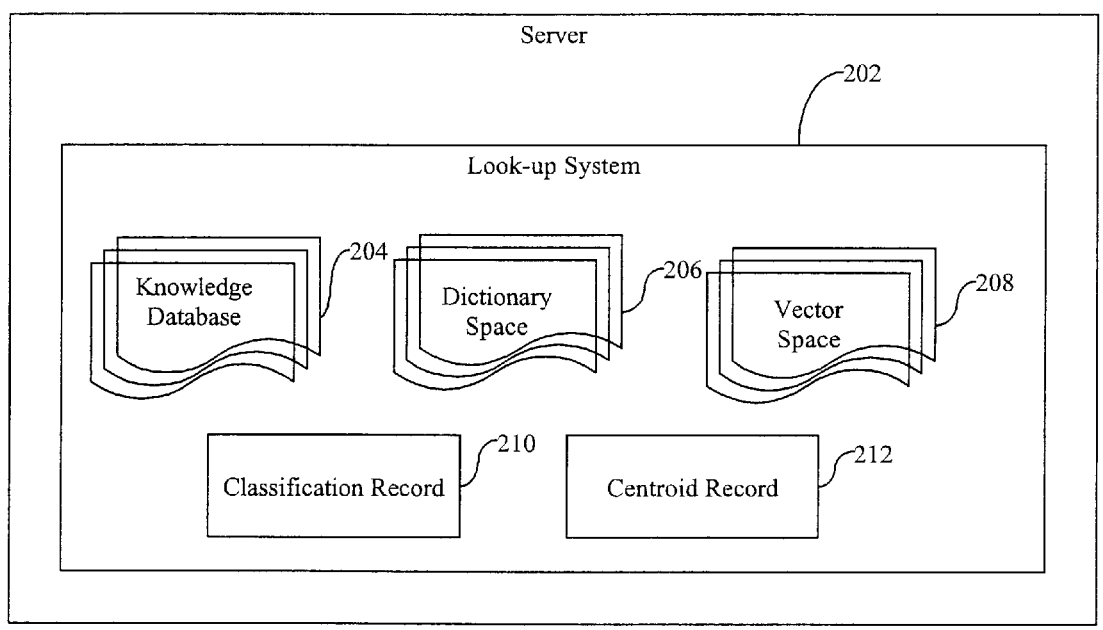
FIG. 2 is a more detailed block diagram showing a database server in the system of FIG. 1, according to a preferred embodiment of the present invention.
Figure 3:
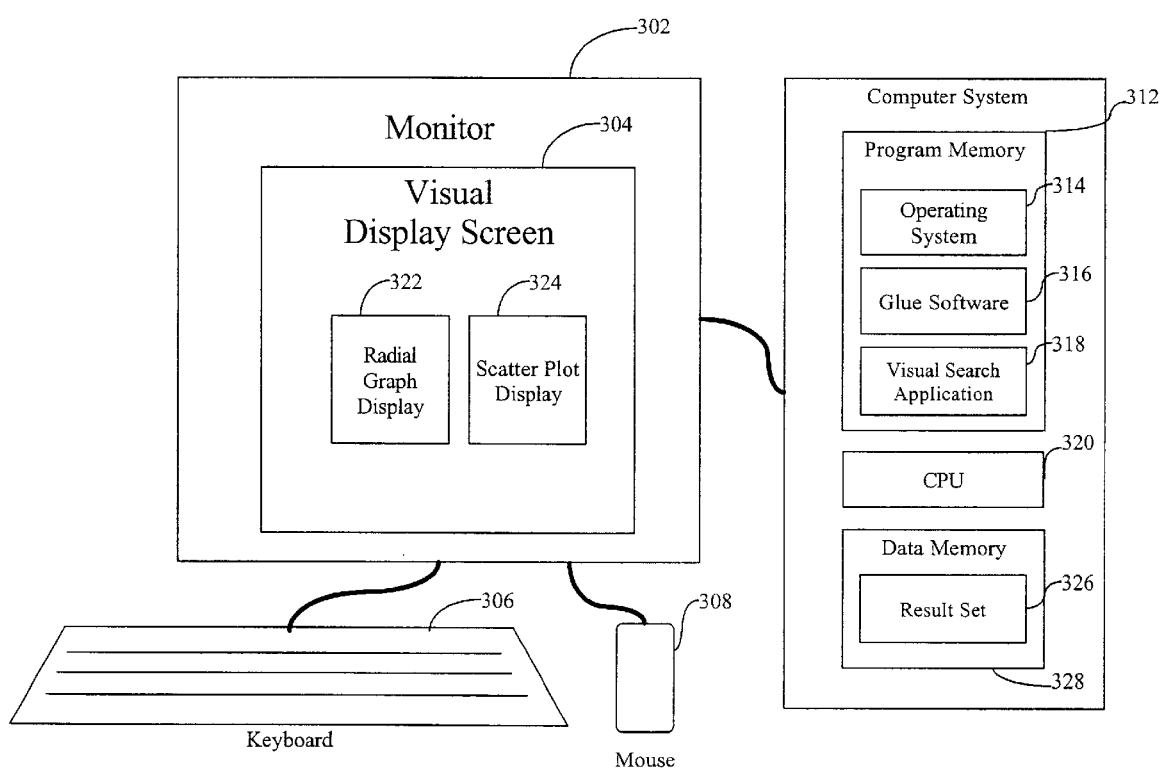
FIG. 3 is a more detailed block diagram showing a computer system in the system of FIG. 1, according to a preferred embodiment of the present invention.

FIGS. 1, 2, and 3 illustrate an exemplary visual search system according to a preferred embodiment of the present invention. The visual search system 100 includes a computer system 102, having a visual search application 318. Computer system 102 may be communicatively coupled with a database system 106, via a local area network interface 104. The local area network interface 104 may be a wired communication link or a wireless communication link. Additionally, computer system 102 may also be communicatively coupled with a wide area network 108 such as the Internet, a wired, wireless, or combination of wired and wireless communication links via a wide area network communication link 110.

Computer system 102 includes controller/processor 320 (shown in FIG. 3) which processes instructions, performs calculations, and manages the flow of information through the computer system 102. Additionally, controller/processor 320 is communicatively coupled with program memory 312. Included within program memory 312 are a visual search application 318 (which will be discussed in later in greater detail), operating system platform 314, and glue software 316. The operating system platform 314 manages resources, such as the data stored in data memory 328, the scheduling of tasks, and processes the operation of the visual search application 318 in the program memory 312. The operating system platform 314 also manages a graphical display interface (not shown), a user input interface (not shown) that receives inputs from the keyboard 306 and the mouse 308, and communication network interfaces (not shown) for communicating with the network links 104,110 respectively. Additionally, the operating system platform 314 also manages many other basic tasks of the computer system 102 in a manner well known to those of ordinary skill in the art.

Glue software 316 may include drivers, stacks, and low level application programming interfaces (API's) and provides basic functional components for use by the operating system platform 314 and by compatible applications that run on the operating system platform 314 for managing communications with resources and processes in the computing system 102.

Network interfaces (not shown) communicatively couple the visual search application 318 in the computer system 102 with a look-up system 202. The look-up system 202, according to one alternative embodiment, comprises a knowledge database 204; a classification record 210, communicatively coupled to the knowledge database 204; a dictionary space 206 communicatively coupled to the knowledge database 204 and to the classification record 210; a centroid record 212, communicatively coupled to the knowledge database 204, the classification record 210, and the dictionary space 206; and a vector space 208 communicatively coupled to the knowledge database 204, the classification record 210, the centroid record 212, and the dictionary space 206. Note that as shown the database server system 106 is shown on a local area network. According to a second embodiment, a look-up system may comprise a remote search server system (not shown). Alternatively, the look-up system 202 may be located in the computer system 102 resident in program memory 312 and managing data in a database memory (not shown) as part of the data memory 328.

The knowledge database 204 comprises multiple partitionings, defined according to different aspects of their content. There are many well-known methods for partitioning knowledge databases based on content in an automated fashion. One possibility is that a series of keyword queries (one for each category of the partition) may be fashioned and used to identify which elements belong in each category. Another possibility is to use text-clustering techniques to create a set of element clusters. A third possibility is to use a combination of these two techniques combined with manual intervention by a human expert, as taught by U.S. patent application Ser. No. 09/429650, "System and Method for Interactive Classification and Analysis of Data" filed on Oct. 29, 1999, the entire teachings of which are hereby incorporated by reference, to determine, on a case by case basis, which elements fall into which category. The classification record 210 contains a listing of which elements are contained in which partitioning.

The dictionary space 206 comprises a set of separate dictionaries of terms; one dictionary for each partitioning of the knowledge database 204. These dictionaries may be created by first finding the most frequently occurring words in the knowledge database 204, then pruning out those words that have little or no relevance for purposes of the classification. Automated counting methods, as taught by U.S. patent application Ser. No. 09/629831, "Method for Generation of an N-Word Phrase Dictionary from a Text" filed on Jul. 31, 2000, the entire teachings of which collectively are hereby incorporated by reference, can help determine word relevance by counting co-occurrence of dictionary terms and classes.

The vector space 208 comprises a set of records, one for each partitioning, which contain a "vector" of equal length to the size of that partitioning's corresponding dictionary. All elements within a partitioning are mapped to each term within that dictionary; with non-zero values equal to the number of times each dictionary term occurs in the knowledge element.

The centroid record 212 contains a listing of the average word occurrence of each term in each partitioning of the knowledge database 204.

Figure 4:
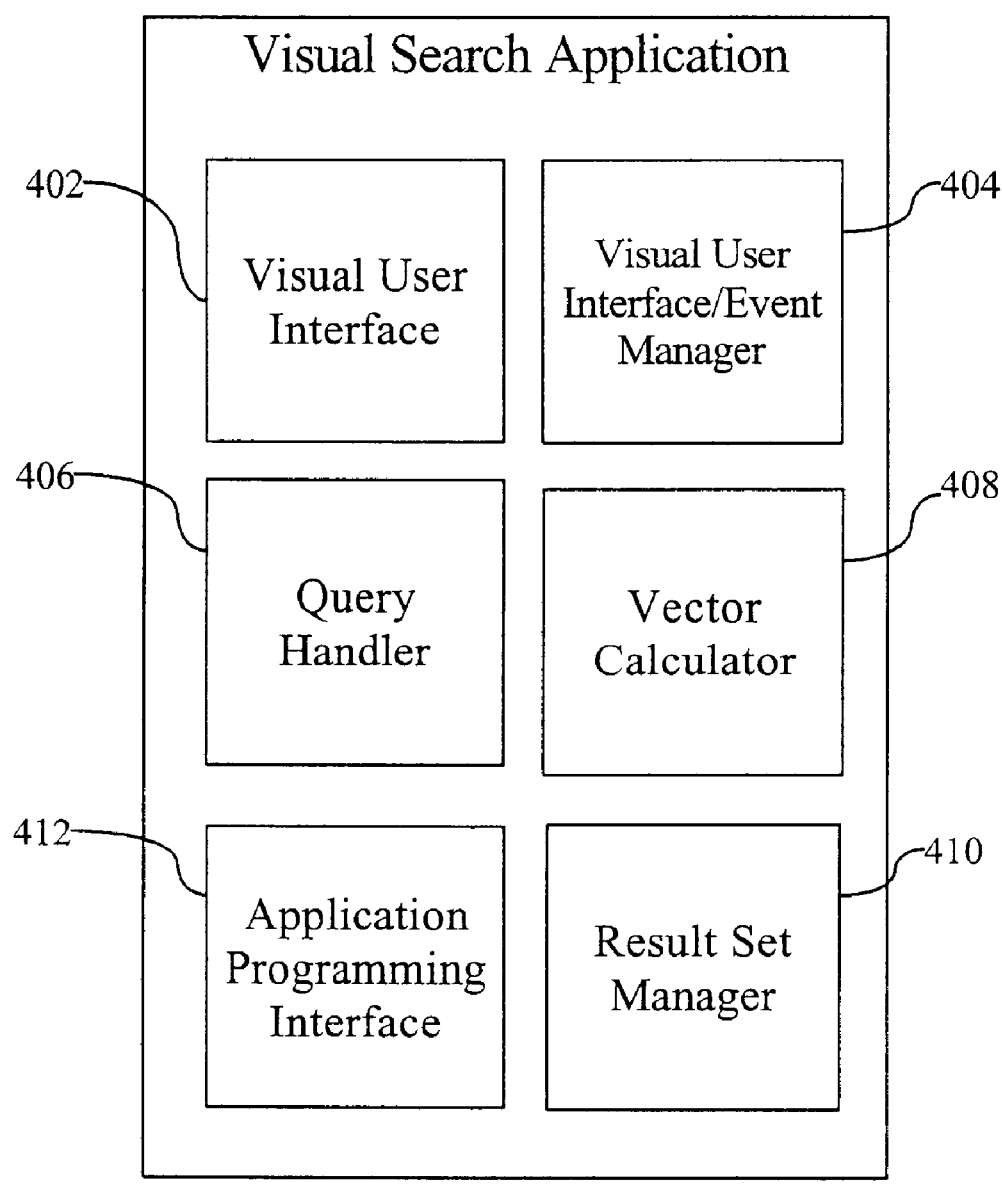
FIG. 4 is a more detailed block diagram of a visual search application in the system of FIG. 3, according to a preferred embodiment of the present invention.

FIG. 4 illustrates the exemplary visual search application 318 according to a preferred embodiment of the present invention. The visual user interface/event manager 404 is structured to receive all visual user interface/event manager 404 events, such as mouse movements, keyboard inputs, drag and drop actions, user selections, and updates to the display 304. Visual user interface/event manager 404 is also structured to receive match records, from the result set manager 410, which will be discussed subsequently, representing the result set 326 for a user initiated search request. These results are then displayed to the user via the display 304. The visual user interface/event manager 404 is communicatively coupled with query handler 406, application programming interface 412, and result set manager 410.

After the user has requested a keyword search, the query handler 406 is invoked from the visual user interface/event manager 404 to initiate the user's search request. Input to the query handler 406 can preferably be a text based search query. The preferably text based search query is parsed to determine which dictionary terms occur within it, then sent to the Application Programming Interface 412 (API) designated for communication with the look-up system 202, and then to the look-up system 202 which has been discussed previously.

The vector calculator 408 then evaluates the relative nearness between the query string vector and each category centroid of each partition, then sends the result set 326 to the result set manager 410. The M nearest categories are sent to the visual user interface/event manager 404 for displaying to the screen 304.

Figure 5:
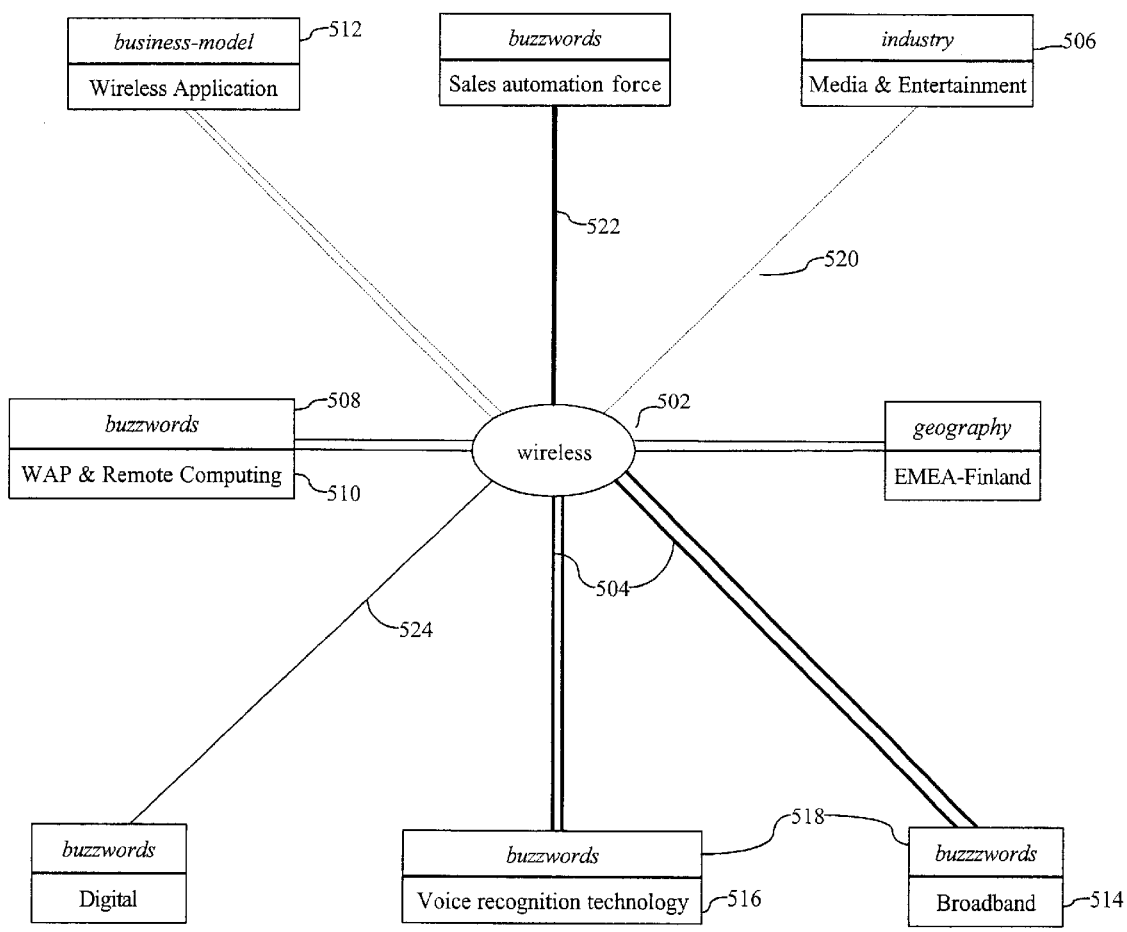
FIG. 5 is an exemplary visual user interface illustrating a radial graph representation of a search query response according to a preferred embodiment of the present invention.

FIG. 5 is an exemplary visual user interface illustrating a radial graph representation 322 of a search query response according to a preferred embodiment of the present invention. The radial graph representation 322 comprises a keyword hub 502; a set of weighted spokes 504, radially coupled to the keyword hub 502; and a set of related concept boxes 506, each related concept box 506 being coupled to opposite end of one weighted spoke 504. The related concept box 506 comprising a top portion 508 and a bottom portion 510, the top portion 508 containing the partition name and the bottom portion 510 containing the category name. The relevance of each concept box 506 is indicated by the appearance of the weighted spoke 504 coupling the concept box 506 to the keyword hub 502. For example, a yellow line 504 (indicated in FIG. 5 as a double line) would indicate a greater relative similarity to the query than a black line 522. Thick spoke lines 504, followed by thin 524, followed by dotted lines 520 indicate decreasing similarity within a color. In the example shown in FIG. 5, the query "wireless" is most nearly related to the categories "Broadband" 514 and "Voice Recognition Technology" 516 within the partitioning "Buzzwords" 518.

Figure 6:
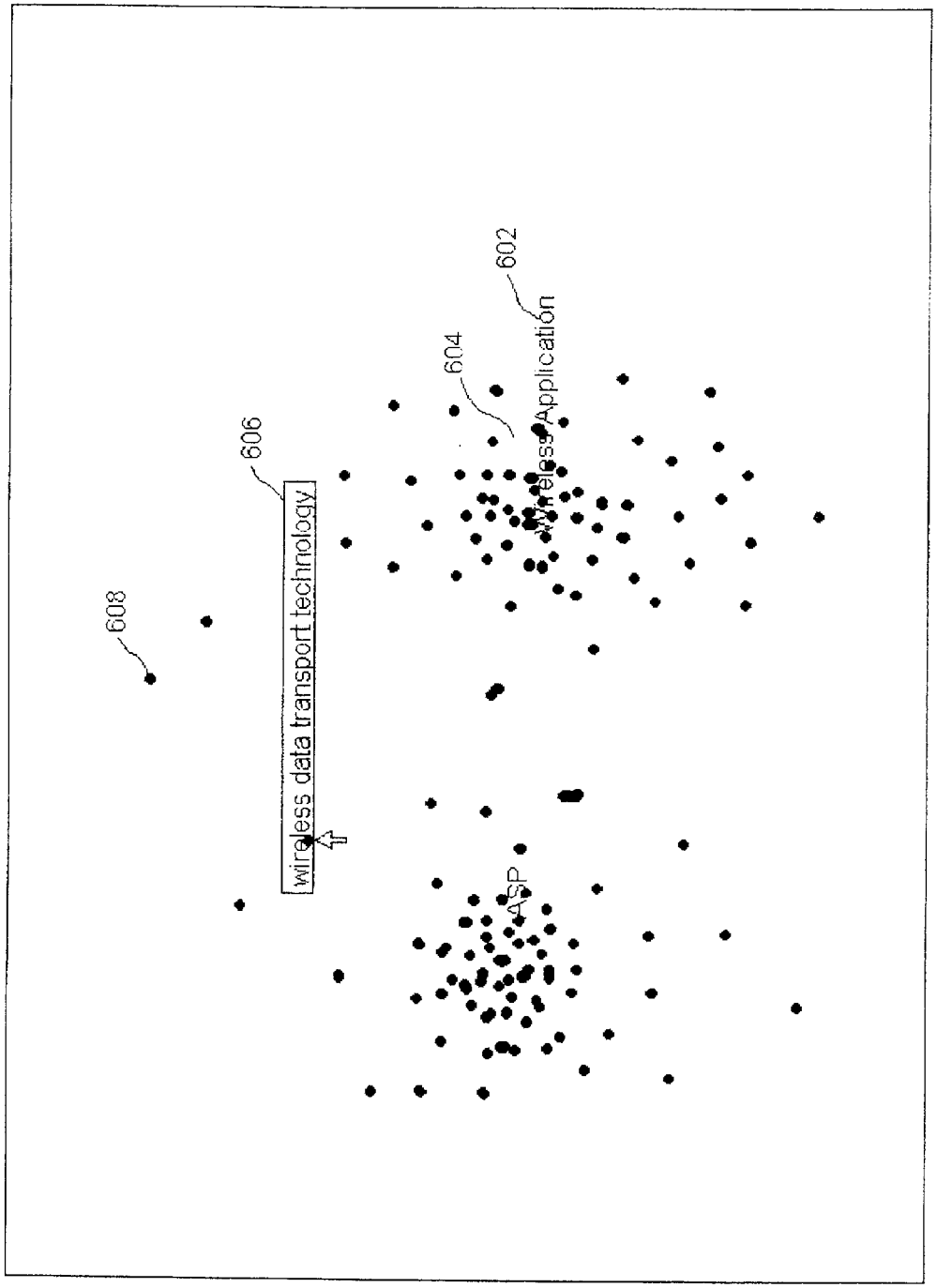
FIG. 6 is an exemplary visual user interface illustrating a scatter plot representation of a search query response according to a preferred embodiment of the present invention.

FIG. 6 is an exemplary visual user interface illustrating a scatter plot representation 324 of a search query response according to a preferred embodiment of the present invention. The knowledge elements of a selected category, along with its nearest neighbor categories, are displayed as points 608 in a scatter plot fashion. Text from a corresponding element is displayed in a pop-up window 606 in response to the user moving a mouse 308 over a point 608 in the plot.

Figure 7:
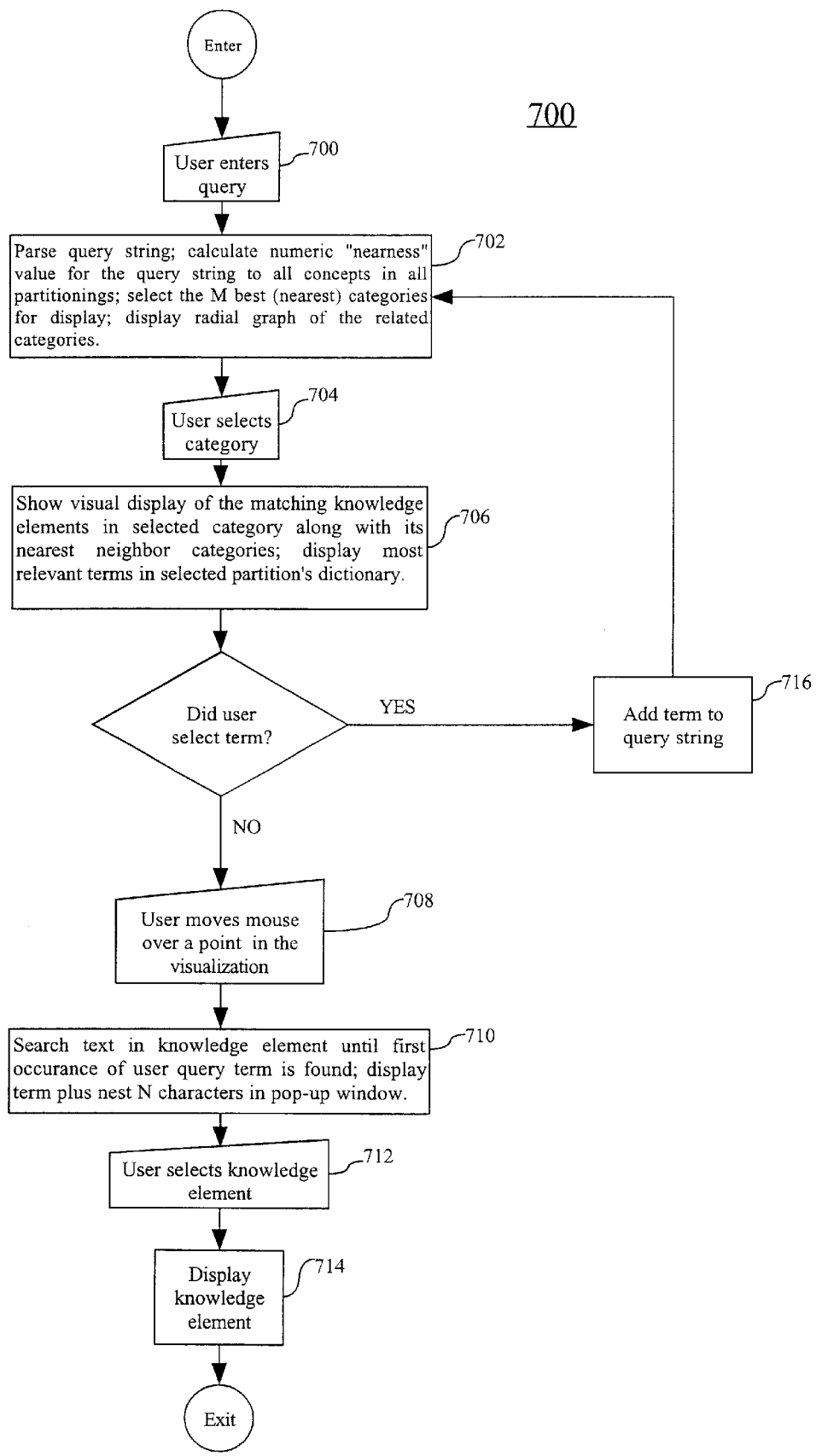
FIG. 7 is an operational flow diagram illustrating an exemplary operational sequence for the system of FIG. 1, according to a preferred embodiment of the present invention.

FIG. 7 is an operational flow diagram illustrating an exemplary operational sequence for the system of FIG. 1. The system enters the sequence at step 700, wherein a user is communicating via a user interface 402 with the computer system 102. The user operates the user interface, such as the mouse 308 or keyboard 306 to enter a search query string. A query handler 406 parses the query string, at step 702, and the vector calculator 408 evaluates the relative nearness between the query string and the categories of each partition. A numeric "nearness" value for the query string to all categories in all partitionings is calculated by finding the average word occurrence (centroid) within a partition of elements and comparing this to the query string vector using the cosine distance metric to determine the distance (d) between vector (X) and vector (Y):

$$d(X, Y) = -\frac{X \cdot Y}{\|X\| \cdot \|Y\|}$$

The M nearest categories are selected for display to the user as a radial graph 322.

The user then provides additional information, at step 704, by "clicking" on the concept box 506 of interest. This additional information helps to narrow the search further, without the user needing to provide additional search terms.

A preferred embodiment of the invention then presents the matching elements and nearest neighbor categories, at step 706, in a visual display 324 as illustrated in FIG. 6. The neighboring categories are chosen by measuring the relative distance of the mean of the selected class to the mean of every other class using the distance metric described above. Each point in the plot represents a knowledge element and its relative position in the dictionary space. The high dimensional dictionary space is reduced to two dimensions by use of a visualization mechanism described in U.S. Pat. No. 6,100,901, "Method and Apparatus for Cluster Exploration and Visualization", filed Jun. 22, 1998, the entire teachings of which are hereby incorporated by reference. Alternatively, the search results could be presented as a list of elements with a corresponding distance calculation displayed.

The preferred embodiment could also calculate the terms within the selected partitioning that have the highest occurrence correlation with the query. The user, at step 716, could then choose to add these suggested terms to the search query string and begin a new search. This further refines the search request to more suit the user's needs.

The user, at step 708, then moves his mouse over points in the plot. Text from the corresponding knowledge element is displayed, at step 710, in a pop-up window 606. The text is found by searching the original knowledge element until the first occurrence of a user query term is found. This term, plus the next N characters are included in the display string, adding enough characters to insure that the last word is not truncated.

Then, at step 712, the user clicks on a point 608 in the visualization to select a knowledge element. The entire text of the original knowledge element is displayed, at step 714, with the query words highlighted. The user may repeat steps 700, 704, 708, or 712 at any time.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer-implemented method comprising the steps of:
   receiving a natural language query from a user interface of a computer system, the query requesting a search of a knowledge repository;
   storing the knowledge repository, the knowledge repository containing a plurality of knowledge elements partitioned into a plurality of categories in partitions of the knowledge repository;
   calculating the distance between the query and the plurality of categories in the partitions of the knowledge repository; and
   presenting to a user, via the user interface, at least one knowledge element of at least one category of the plurality of categories that comprises a nearest distance to the query.

2. The computer-implemented method of claim 1, further comprising a step of:
   displaying, via the user interface, the at least one category via radial graph.

3. The computer-implemented method of claim 2, wherein the radial graph comprises:
   a keyword hub;
   a set of weighted spokes, radially coupled to the keyword hub; and
   a set of related concept boxes, each related concept box being coupled to an end of a weighted spoke.

4. The computer-implemented method of claim 3, wherein each of the set of weighted spokes comprises a relevance factor indicated by its style and color.

5. The computer-implemented method of claim 1, further comprising the steps of:
   selecting a category of the plurality of categories; and
   displaying, via the user interface, knowledge elements that match the query and that are in the selected category along with any that are in nearest neighbor categories.

6. The computer-implemented method of claim 5, wherein the displaying step comprises displaying a scatter plot representation of the displayed knowledge elements.

7. The computer-implemented method of claim 5, further comprising the step of
   displaying terms from a dictionary associated with a selected category of the plurality of categories.

8. The computer-implemented method of claim 5, wherein the displayed knowledge elements are electronic documents.

9. A computer-implemented method comprising the steps of:
   receiving a natural language query from a user interface of a computer system;
   calculating the distance between the query and a plurality of categories in partitions of a knowledge repository;
   presenting, via the user interface, at least one category that comprises a nearest distance to the query;
   selecting a category;
   displaying, via the user interface, matching knowledge elements in a selected category along with nearest neighbor categories;
   detecting a selection of one point in a scatter plot representation;
   searching text in a knowledge element associated with the selected one point until a first occurrence of a user query is found;
   displaying, via the user interface, a query term at least in partial character form;
   selecting a knowledge element; and
   presenting, via the user interface, the selected knowledge element.

10. The computer-implemented method of claim 9, further comprising the step of highlighting all occurrences of query text within the selected knowledge element.

11. A system comprising:
    a visual user interface;
    a visual user interface/event manager communicatively coupled to the visual user interface;
    a query handler, communicatively coupled to the visual user interface/event manager;
    an application programming interface, communicatively coupled to the visual user interface/event manager;
    a look-up system, communicatively coupled to the application programming interface;
    a vector calculator, communicatively coupled to the application programming interface;
    a result set, communicatively coupled to the vector calculator; and
    a result set manager, communicatively coupled to the visual user interface/event manager, to the application programming interface, and to the result set, and wherein the visual user interface/event manager, in response to receiving a natural language query, calculates the distance between the query and a plurality of categories in partitions of a knowledge repository, and presents, via a radial graph in the visual user interface, at least one category that comprises a nearest distance to the query.

12. The system of claim 11, wherein the radial graph comprises:
    a keyword hub;
    a set of weighted spokes, radially coupled to the keyword hub; and
    a set of related concept boxes, each related concept box being coupled to an end of a weighted spoke.

13. The system of claim 12, wherein each of the set of weighted spokes comprises a relevance factor indicated by its style and color.

14. The system of claim 11, wherein the look-up system comprises
    a knowledge database;
    a classification record, communicatively coupled to the knowledge database;
    a dictionary space, communicatively coupled to the classification record and to the knowledge database;
    a vector space, communicatively coupled to the knowledge database, the classification record, and the dictionary space; and
    a centroid record, communicatively coupled to the knowledge database, the classification record, the dictionary space, and the vector space.

15. The system of claim 14, wherein the knowledge database comprises multiple partitionings based on different aspects of their content.

16. A computer readable medium including computer instructions for driving a visual user interface, the computer instructions comprising instructions for:
- receiving a natural language query, the query requesting a search of a knowledge repository;
- storing the knowledge repository, the knowledge repository containing a plurality of knowledge elements partitioned into a plurality of categories in partitions of the knowledge repository;
- calculating the distance between the query and the plurality of categories in the partitions of the knowledge repository; and
- presenting to a user at least one knowledge element of at least one category of the plurality of categories that comprises a nearest distance to the query.

17. The computer readable medium of claim 16, further comprising computer instructions for:
- selecting a category; and
- displaying knowledge elements that match the query and that are in the selected category along with any that are in nearest neighbor categories in a scatter plot representation of the displayed knowledge elements.

18. The computer readable medium of claim 17, wherein the displayed knowledge elements are electronic documents.

19. A computer readable medium including computer instructions for driving a visual user interface, the computer instructions comprising instructions for:
- receiving a natural language query;
- calculating the distance between the query and a plurality of categories in partitions of a knowledge repository;
- presenting at least one category that comprises a nearest distance to the query; and
- displaying the at least one category via radial graph.

20. The computer readable medium of claim 19, wherein the radial graph comprises:
- a keyword hub;
- a set of weighted spokes, radially coupled to the keyword hub; and
- a set of related concept boxes, each related concept box being coupled to an end of a weighted spoke.

21. The computer readable medium of claim 20, wherein each weighted spoke comprises a relevance factor indicated by its style and color.

22. A computer readable medium including computer instructions for driving a visual user interface, the computer instructions comprising instructions for:
- receiving a natural language query;
- calculating the distance between the query and a plurality of categories in partitions of a knowledge repository;
- presenting at least one category that comprises a nearest distance to the query;
- detecting a selection of one point in the scatter plot representation;
- searching text in a knowledge element associated with the selected one point until a first occurrence of a user query is found;
- displaying a query term at least in partial character form;
- selecting a knowledge element; and
- presenting the selected knowledge element.

23. An apparatus comprising:
- a visual user interface;
- a visual user interface/event manager communicatively coupled to the visual user interface;
- a query handler, communicatively coupled to the visual user interface/event manager;
- an application programming interface, communicatively coupled to the visual user interface/event manager;
- a look-up system, communicatively coupled to the application programming interface;
- a vector calculator, communicatively coupled to the application programming interface;
- a result set, communicatively coupled to the vector calculator; and
- a result set manager, communicatively coupled to the visual user interface/event manager, to the application programming interface, and to the result set for:
  - receiving a natural language query;
  - calculating the distance between the query and a plurality of categories in partitions of a knowledge repository; and
  - displaying, via a radial graph in the visual user interface, at least one category that comprises a nearest distance to the query.

24. The apparatus of claim 23, wherein the look-up system comprises:
- a knowledge database;
- a classification record, communicatively coupled to the knowledge database;
- a dictionary space, communicatively coupled to the classification record and to the knowledge database;
- a vector space, communicatively coupled to the knowledge database, the classification record, and the dictionary space; and
- a centroid record, communicatively coupled to the knowledge database, the classification record, the dictionary space, and the vector space.

* * * * *